Dec. 5, 1944.  E. G. STAUDE ET AL  2,364,323
VARIABLE SPEED TRANSMISSION
Filed June 25, 1942  3 Sheets-Sheet 1
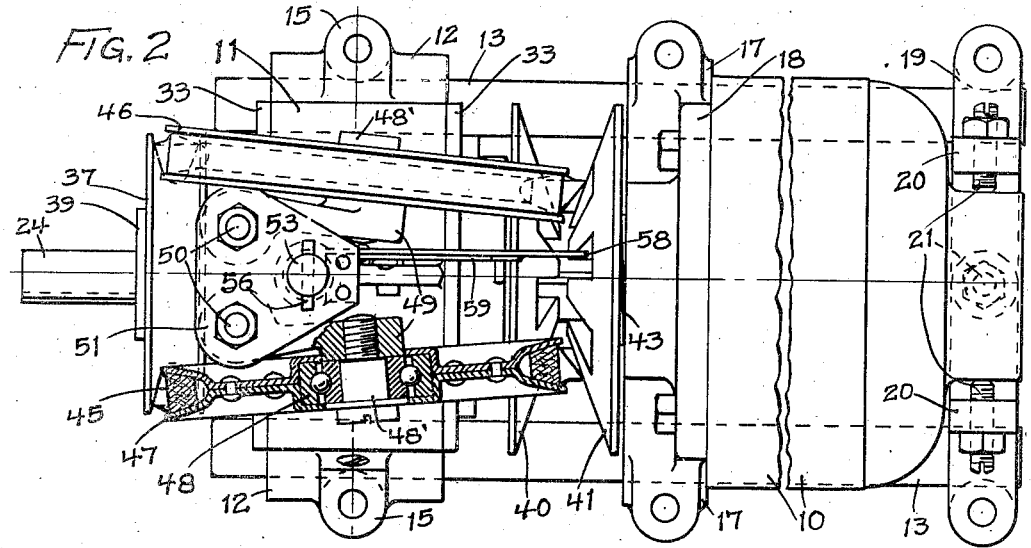
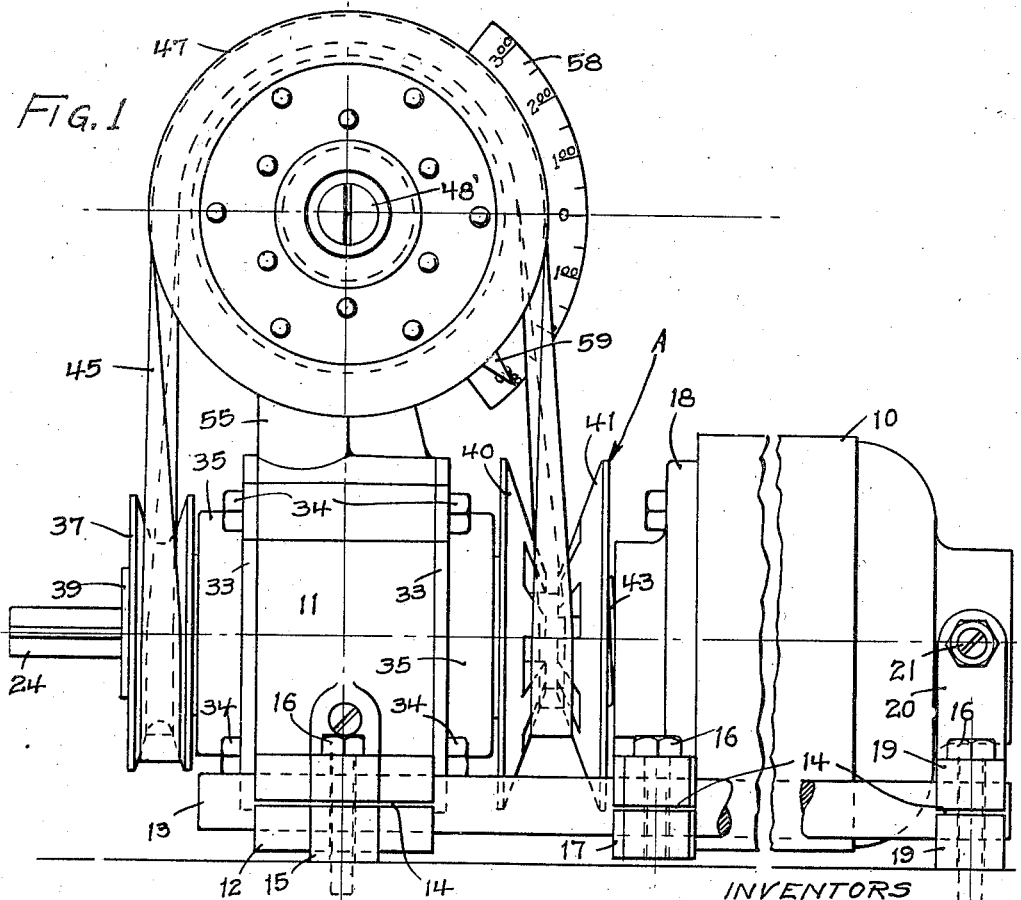
INVENTORS
EDWIN G. STAUDE
AXEL M. WALSTROM
BY Paul, Paul & Moore
ATTORNEYS

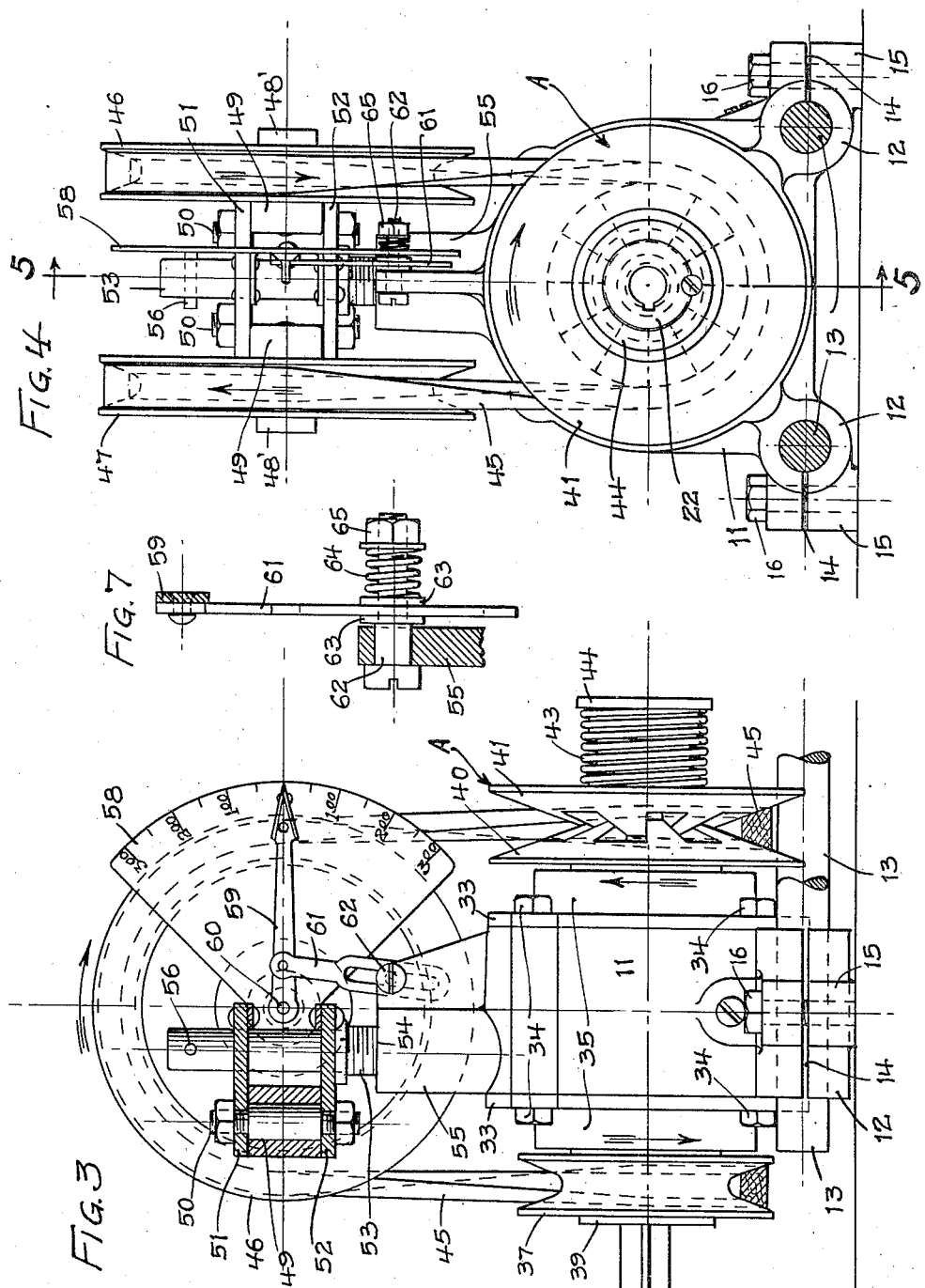

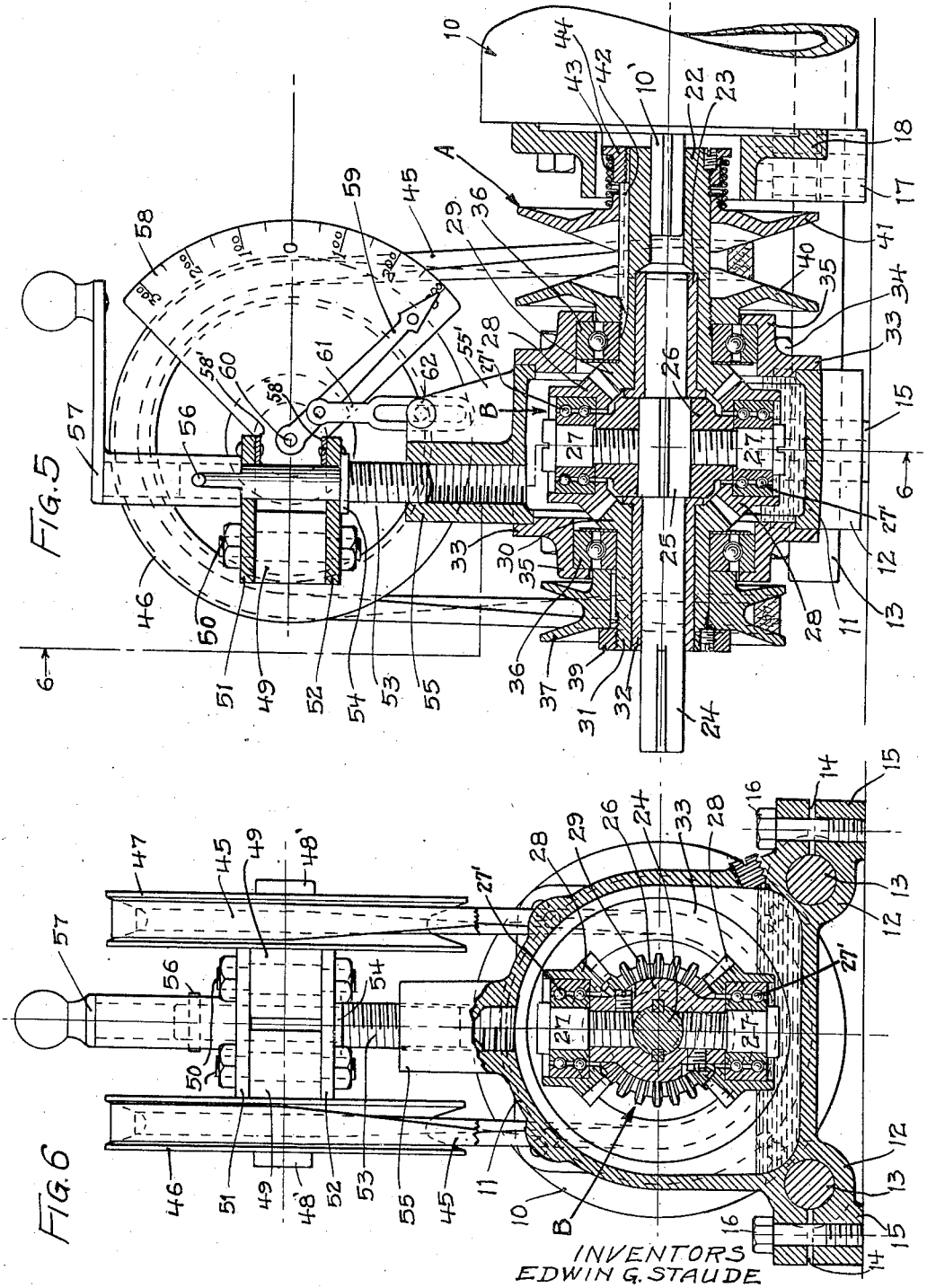

Patented Dec. 5, 1944

2,364,323

UNITED STATES PATENT OFFICE 2,364,323

VARIABLE SPEED TRANSMISSION

Edwin G. Staude and Axel M. Walstrom, Minneapolis, Minn.; said Walstrom assignor to said Staude Application June 25, 1942, Serial No. 448,392

6 Claims. (Cl. 74—286)

This invention relates to new and useful improvements in variable speed transmissions of the general character disclosed in the co-pending application of Edwin G. Staude, Serial No. 447,340, filed June 17, 1942.

An object of the present invention is to provide a variable speed transmission of the general type disclosed in the above identified application, having means whereby the rotation of the driven shaft may be reversed when desired.

A further object is to provide a variable speed transmission including a drive member adapted for rotation in one direction, and having a single belt operatively connecting it to a driven shaft through a power transmission mechanism, whereby the speed of the driven shaft may be varied, and also whereby its rotation may be reversed.

A further object is to provide a variable speed transmission including a drive member and a driven member mounted in axial alinement, and a variable diameter pulley being nonrotatably mounted on the drive member, and a fixed diameter pulley being rotatively mounted on the driven member, and a single belt operatively connecting together said pulleys whereby they will rotate in opposite directions, and a differential gearing being interposed between said pulleys and having a shaft operatively connected thereto, the operation of which may be conveniently controlled by varying the effective diameter of the variable diameter pulley.

A further object is to provide a variable speed transmission comprising a drive member adapted to be connected to a source of power and having a driven shaft axially alined therewith, and means being provided for transmitting power from the drive member to the driven shaft, whereby the speed of the driven shaft may be gradually varied from minimum to maximum, and whereby its rotation may also be reversed.

A further object is to provide a transmission of the character disclosed, comprising a variable diameter pulley having means for connecting it to a source of power, and a fixed diameter pulley mounted in axial alinement with said variable diameter pulley and operatively connected thereto by a single belt, whereby said pulleys rotate in opposite directions, and idler sheaves having running connections with said belt and having means for moving them towards or away from said pulleys to cause the variable diameter pulley to automatically change its effective diameter, thereby to control the speed of the fixed diameter pulley.

Other objects of the invention reside in the novel construction of the variable diameter pulley whereby its effective diameter may be automatically varied by increasing or decreasing the tension in the belt; in the axial alinement of the two pulleys and the differential gearing, whereby the transmission may be made very small and compact; in the means provided in combination with the adjustably mounted idler sheaves for indicating the speed of the driven shaft; in the novel mounting of the idler sheaves whereby the angularity of the belt runs are minimized; and in the simple and inexpensive construction of the transmission as a whole, whereby it may be manufactured at small cost and also whereby the speed and direction of rotation of the driven shaft may be readily and conveniently controlled by manipulation of a single control member.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be within the scope of the claims which follow.

Figure 1 is a side view of our improved transmission showing it connected to a source of power such as a motor;

Figure 2 is a plan view of Figure 1, with one of the idler sheaves shown in section to more clearly illustrate its construction;

Figure 3 is a side view similar to Figure 1, but partially in section, to more clearly illustrate the means for indicating the speed of the driven shaft, and the transmission being shown detached from the motor;

Figure 4 is an end view of Figure 3;

Figure 5 is a longitudinal sectional view substantially on the line 5—5 of Figure 4, showing the general construction of the transmission, including the differential gearing interposed between the variable diameter and fixed diameter pulleys;

Figure 6 is a cross-sectional view substantially on the line 6—6 of Figure 5; and Figure 7 is a detail sectional view on an enlarged scale, showing the means for frictionally retaining the connecting link of the pointer of the speed indicator in adjusted position.

The novel transmission herein disclosed is shown comprising a casing 11 provided at its lower portion with spaced hubs 12 bored to receive a pair of spaced parallel rods 13, which may extend beyond the casing to provide a support for a suitable motor, generally designated by the numeral 10. The hubs are preferably split, as best shown in Figures 4 and 6, and have bosses 15 formed thereon, shown bored to receive suitable cap screws 16 which may be received in threaded engagement with a suitable base plate (not shown), thereby to secure the casing 11 to said base, and at the same time securing the casing in fixed position to the rails or rods 13.

In Figures 1, 2, and 5, we have shown the inner end of the motor 10 supported by an annular member or bracket 18, having split hubs 17, adapted to receive the supporting rods 13. The outer end of the motor may be supported in a yoke 20, also having split hubs 19 adapted to receive the supporting rods 13, as clearly illustrated in Figure 1. Cap screws 16 are received in the split hubs 17 to secure the bracket 18 in fixed position on the rods 13, and similar cap screws 16 are received in the split hubs 19 of the yoke 20. The cap screws 16 in the yoke 20 may be received in threaded engagement with the base plate (not shown) in a manner similar to the cap screws securing the casing 11 in position. The end of the motor is shown supported in the yoke 20 by suitable threaded studs 21 which provide means for axially alining the outer end of the motor with the axis of the transmission, subsequently to be described.

The motor 10 is shown having a shaft 10' which fits into a bore in a drive member or sleeve 22 and is suitably keyed thereto, whereby the sleeve will rotate simultaneously with the shaft 10'. A suitable bushing 23 is provided at the inner end of the member 22 to provide a bearing for one end of a driven shaft 24, whereby said end of the shaft 24 is journaled in axial alinement with the motor 10. The shaft 24 has an enlarged central portion 25 whereon is mounted a hub 26 of a differential gearing, generally designated by the reference character B, as best illustrated in Figure 5. The hub 26 is suitably keyed or splined to the enlarged shaft portion 25, and has radially disposed studs 27 secured therein. Suitable anti-friction bearings 27' are shown mounted on the studs 27 to support miter gears 28.

A complemental miter gear 29 is provided at the inner end of the drive member 22 and may be integrally formed therewith, as shown in Figure 5. The gear 29 meshes with the gears 28. A similar complemental miter gear 30 is provided at the opposite side of the hub 26 and also meshes with the gears 28. The gear 30 is shown integrally formed with or secured to a sleeve member 31, having a bushing 32 mounted therein for rotatably supporting the opposite end of the driven shaft 24, as clearly illustrated in Figure 5.

The casing 11 is preferably formed with open ends which are normally closed by suitable end plates 33. Cap screws or bolts 34 secure the end plates to the casing. Each end plate is shown having a hub 35 adapted to receive the outer races of suitable anti-friction bearings 36, the inner races of which receive and support the inner ends of the sleeve members 22 and 31 in axial alinement with one another, as shown in Figure 5.

A suitable fixed diameter pulley 37 is non-rotatably mounted upon the sleeve member 31 and is secured thereto by such means as a lock nut 39, shown received in threaded engagement with the outer end of the sleeve 31.

A variable diameter pulley, generally designated by the reference character A, is non-rotatably mounted upon the drive member or sleeve 22 for direct rotation therewith. The pulley A is composed of two members, indicated by the numerals 40 and 41. The member 40 is fixed against radial and axial movements upon the sleeve 22, while the member 41 is non-rotatably supported on the sleeve, but is adapted for sliding movement towards or away from the fixed member 40. A suitable key or spline 42 prevents relative rotary movements of the pulley members 40 and 41, but permits free sliding movement of the member 41 on the sleeve.

A compression spring 43 is interposed between the pulley member 41 and a flanged lock nut 44, and constantly urges the pulley member 41 in a direction towards the fixed pulley member 40. The lock nut 44 is received in threaded engagement with the outer end of the sleeve member 22 and locks the key or spline 42 in fixed position in the sleeve. A suitable V-belt 45 operatively connects together the pulleys 37 and A, as shown in Figures 1 and 5, and is constantly compressed between the members 40 and 41 of pulley A by the action of spring 43.

The belt 45 is retained in operative relation with the pulleys 37 and A by a pair of idler sheaves 46 and 47, shown journaled on studs 48' by suitable anti-friction bearings 48. The studs 48' are secured in the swingable ends of a pair of arms 49, pivotally mounted on vertically disposed shouldered studs 50, shown mounted in spaced plates 51 and 52. The shouldered studs 50 retain the plates 51 and 52 in fixed spaced relation, whereby the arms 49 may freely pivot on the studs between said plates, as will be understood by reference to Figure 3. A vertically disposed post 53 is received in threaded engagement with an upright projection or boss 55 on the casing 11, and has a flange 54 for supporting the plates 51 and 52 thereon.

A suitable cross-pin 56 is secured in the upper end of the post 53 adapted to be engaged by the lower forked end of a suitable operating crank 57, as shown in Figure 5. Rotation of the post 53 by manipulation of the crank 57, when attached to the upper end of the post, will cause the sheaves 46 and 47 to move towards or away from the pulleys 37 and A, depending upon the direction of its rotation. Such adjustment of the sheaves 46 and 47 will cause the effective diameter of pulley A to vary as a result of the spring actuated member 41 thereof. In other words, when the crank is rotated in a direction to cause the sheaves 46 and 47 to move towards the pulleys 37 and A, the slackening of the belt will cause the member 41 of pulley A to move inwardly towards its complemental fixed member 40 against that portion of the belt supported between the members 40 and 41, thereby automatically changing the effective diameter of pulley A and tightening the belt, as will be understood by reference to Figure 3. Such enlarging of the effective diameter of pulley A will obviously increase the speed of pulley 37 relative to the speed of pulley A, which in turn will vary the speed of the driven shaft 24. It is to be understood that the variable diameter pulley A may rotate at a uniform speed as a result of being directly connected to and driven by the constant speed motor 10.

Means is provided for indicating the relative speed of the driven shaft 24, and is shown comprising a dial segment 58, shown formed with spaced ears 58' which may be secured to the plates 51 and 54, as indicated in Figures 3, 4, and 5. An indicator hand 59 is pivoted at 60 to the segment 58, and has one end of a slotted connecting link pivotally connected thereto. The slotted end of the link 61 is frictionally connected to a bolt 62 between suitable washers 63 which are tensioned by a spring 64 mounted on the bolt 62, and adjustably retained thereon by a nut 65. The bolt 62 is supported in a web or flange 55', shown integrally formed with the wall of the casing 11, and the boss 55 provided at the upper portion thereof.

The dial segment 58 may be marked with any suitable indicia which may represent various speeds, as shown for example in Figures 3 and 5. The pointer 59 is also so positioned with respect to the dial 58 that when the effective diameter of the variable diameter pulley A is identical to or corresponds to the effective diameter of the fixed pulley 37, the tip of the pointer will register with the zero or neutral mark on the dial 58, as shown in Figure 3.

In the operation of the novel variable speed transmission herein disclosed, the variable diameter pulley A is directly connected to and driven from a suitable source of power such as the motor 10. The driven shaft 24 may be connected to any piece of apparatus or machine to be driven. In Figure 3 the transmission is shown in its neutral position, wherein the effective diameters of pulleys 37 and A are identical. Under such conditions, the driven shaft 24 will be at rest, as a result of being drivingly connected to the pulley 37 through the differential gearing B. When the effective diameter of pulley A is thus adjusted to correspond to the effective diameter of pulley 37, the miter gears 29 and 30, secured respectively to sleeve members 22 and 31, will rotate the intermediate differential gears 28 upon their respective studs 27, without imparting any rotation to the differential hub 26, secured to the enlarged portion 25 of the driven shaft 24.

If, however, the crank 57 is rotated in a counterclockwise direction, provided of course that the post 53 has a right-hand thread, the idler sheaves 46 and 47 will be moved outwardly away from the pulleys 37 and A, thereby causing the loop of the belt engaged with pulley A, to outwardly force the movable pulley member 41 away from its fixed complemental pulley member 40, with the result that the effective diameter of pulley A becomes smaller and thereby causes the pulleys 37 and A to rotate at variant speeds. Such relative variant speeds between the pulleys 37 and A will cause the differential hub 26 to rotate in one direction within the casing 11, thereby imparting rotation to the driven shaft 24. The speed of the driven shaft 24 may be gradually varied from neutral to maximum by manipulation of the crank 57, as will be understood by reference to Figures 3 and 5.

When the crank is rotated in a clockwise direction, there is a tendency to slacken the belt 45, which slack will be automatically taken up by the movable member 41 of pulley A, as a result of the action of spring 43. When the effective diameter of pulley A becomes relatively greater than the effective diameter of pulley 37, the rotation of driven shaft 24 will be reversed. The reverse speed of rotation of said shaft may be gradually varied from neutral to maximum by the simple manipulation of control crank 57.

From the foregoing, it will therefore be noted that the driven shaft 24 may be operated at any speed from neutral to maximum, in either direction, by the simple manipulation of control crank 57.

The transmission is comparatively simple and inexpensive and provides a very compact unit which requires very little space. It is capable of performing the combined functions of such mechanisms as a speed reducer, reversing mechanism, and a variable speed drive, now frequently employed for transmitting power from a high speed drive shaft to a relatively slower rotating driven member or machine. The transmission also provides an infinitely greater number of selective speeds, as the speed of the driven shaft may be gradually varied from zero to maximum without steps, which is highly desirable in the operation of a great many mechanisms. In the drawings it will be noted that the motor 10 has its shaft 10' fitted into and keyed to the adjacent end of the drive member or sleeve 22. It is to be understood, however, that in lieu of the motor 10 and its shaft 10', the member 22 may be provided with a suitable shaft extension adapted to receive a pulley or gear which may receive power from an available power source through a belt or other driving connection.

It will be apparent to those skilled in the art that we have accomplished at least the principal objects of our invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that our invention is not limited thereto.

We claim as our invention:

1. A variable speed transmission comprising a pair of axially alined members, a differential gearing operatively connecting together said members, means whereby one of said members may be driven from a source of power, a driven shaft operatively connected to the differential gearing and projecting from one end of the other of said members whereby it may be connected to a load to be driven, a fixed diameter pulley secured to one of said members and a variable diameter pulley secured to the other of said members, a belt operatively connecting together said pulleys for rotation in opposite directions, a pair of sheaves having running connections with said belt, and means for shifting the positions of said sheaves with respect to said pulleys, thereby to permit the variable diameter pulley to automatically change its effective diameter and thereby vary the speed of the driven shaft.

2. In a transmission of the class described, a casing, a differential gearing mounted in said casing and having tubular members projecting from the casing in opposite directions, a fixed diameter pulley secured to one of said members and a variable diameter pulley secured to the other of said members, a single V-belt having running connections with said pulleys whereby they are driven in opposite directions, a driven shaft supported in one of said tubular members and adapted for relative rotation therein, means operatively connecting the driven shaft to the differential gearing, a pair of idler sheaves having running connections with said belt, a movable support for said pulleys and means for shifting the position of the movable support with respect to said pulleys, thereby to vary the tension in the belt and cause the effective diameter of said variable diameter pulley to vary.

3. In an apparatus of the class described, a fixed diameter pulley and a variable diameter pulley, means for supporting said pulleys, a V-belt operatively connecting together said pulleys for rotation in opposite directions, a pair of sheaves having running connections with said belt, a movable support for said sheaves, and means for shifting the position of said support to vary the tension in the belt and thereby increase or decrease the effective diameter of the variable diameter pulley to change the relative speeds of said pulleys.

4. In an apparatus of the class described, a pair of axially alined pulleys, one having a fixed diameter and the other a variable diameter, means for supporting said pulleys, a V-belt operatively connecting together said pulleys for rotation in opposite directions, a pair of sheaves having running connections with said belt, a movable support for said sheaves, means whereby the position of said support may be shifted to vary the tension in the belt and whereby the effective diameter of the variable diameter pulley may be varied, and means for indicating the speed of one of said pulleys.

5. In an apparatus of the class described, a pulley having a fixed diameter, a second pulley comprising coacting members adapted to support a belt therebetween, means for supporting said pulleys in axial alinement, one of said pulley members being axially movable with respect to its complemental pulley member whereby the effective diameter of said pulley may be varied, a spring constantly urging said axially movable pulley member towards said complemental pulley member, a V-belt operatively connecting together said pulleys for rotation in opposite directions, means for guiding the belt around said pulleys, and means for increasing or decreasing the tension in the belt, thereby to axially translate said movable pulley member to cause variation in the effective diameter of the variable diameter pulley.

6. In an apparatus of the class described, a pulley having a fixed diameter, a second pulley comprising coacting disk-like members adapted to support a belt therebetween, means for supporting said pulleys in axial alinement, one of said pulley members being fixed to said supporting means and the other being axially movable thereon, a spring constantly urging said axially movable pulley member towards said fixed pulley member, a V-belt operatively connecting together said pulleys for rotation in opposite directions, guide sheaves for guiding the belt around said pulleys, and means associated with said sheaves for increasing or decreasing the tension in the belt, thereby to axially translate said movable pulley member to vary the effective diameter of the variable diameter pulley.

EDWIN G. STAUDE.
AXEL M. WALSTROM.